J. B. NICKS.
GRAVE FILLING DEVICE.
APPLICATION FILED JUNE 13, 1917.
1,278,725.
Patented Sept. 10, 1918.
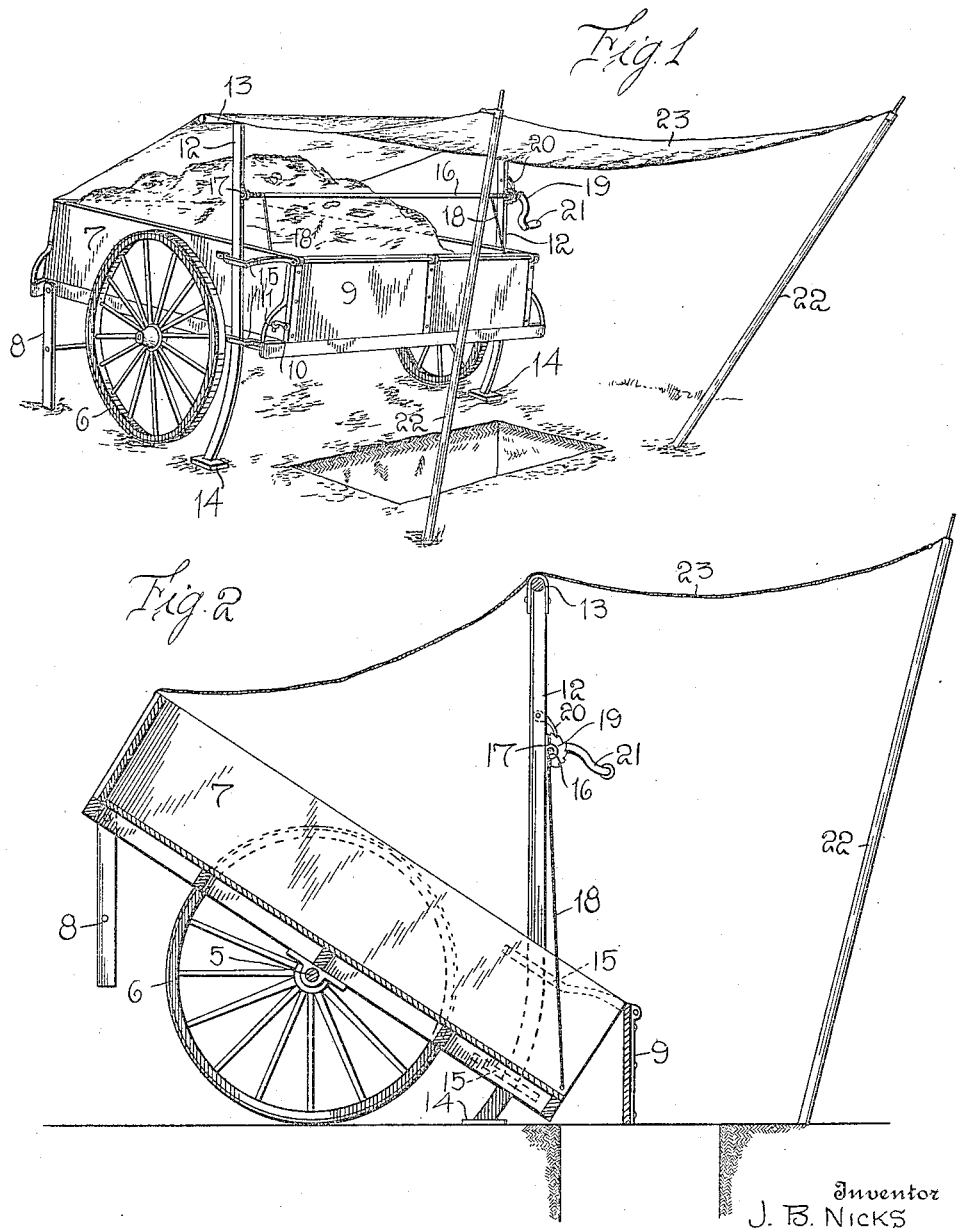
Inventor
J. B. NICKS
By Watson E. Coleman
Attorney

UNITED STATES PATENT OFFICE.

JOSEPH BURTON NICKS, OF COLUMBIA, TENNESSEE.

GRAVE-FILLING DEVICE.

1,278,725.

Specification of Letters Patent.  Patented Sept. 10, 1918.

Application filed June 13, 1917.  Serial No. 174,570.

*To all whom it may concern:*

Be it known that I, JOSEPH B. NICKS, a citizen of the United States, residing at Columbia, in the county of Maury and State of Tennessee, have invented certain new and useful Improvements in Grave-Filling Devices, of which the following is a specification, reference being had to the accompanying drawings.

This invention relates to an improved grave filling device, and has for its primary object to provide simply constructed and easily operated means for filling a grave with the earth which has been excavated in digging the same.

It is another and more particular object of the invention to provide a device for the above purpose, embodying a wheeled cart, and means for supporting a canopy upon the cart and in extended relation over the grave for the protecting of the digger from the sun and elements, said car being tiltable upon its axle and movably mounted at one end upon certain of the canopy supports, whereby the earth may be returned to the grave.

It is an additional object of my invention to provide simple and easily operated means for raising the discharge end of the cart body to dispose the same in a horizontal position to receive the excavated earth.

With the above and other objects in view, my invention consists in the novel features of construction, combination and arrangement of parts to be hereinafter more fully described, claimed and illustrated in the accompanying drawing, in which, Figure 1 is a perspective view illustrating the preferred embodiment of my invention; and Fig. 2 is a vertical sectional view showing the cart body in its discharge position.

Referring in detail to the drawing, 5 designates a suitable axle having the supporting wheels 6 revolubly mounted upon its opposite ends. Between the wheels 6, the cart body 7 is pivotally mounted upon the axle 5. Supporting legs or standards 8 are pivotally connected to the cart body 7 at one end thereof. A swinging tail gate 9 is provided at the other end of the cart, said gate being suitably mounted at its upper edge in the side walls of the cart body and having fastening hooks 10 adjacent to its lower edge for engagement in suitable eyes or staples 11 on the side walls of the cart body, whereby the tail gate may be held in its closed position.

In conjunction with the dumping cart, a pair of uprights 12 are employed, said uprights being connected at their upper ends by a cross bar 13. The lower ends of these uprights are preferably slightly curved and provided with relatively heavy foot pieces 14. The uprights 12 are disposed through spaced guide straps 15 secured to the opposite side walls of the cart body. Upon the uprights 12, a shaft 16 is rotatably mounted in suitable bearings 17 fixed to the uprights. Chains 18 are connected to said shaft adjacent its opposite ends, the lower ends of said chains being suitably attached to the sides of the cart body adjacent the tail gate 9. A ratchet 19 is also fixed upon said shaft for engagement by the gravity pawl or dog 20, whereby said shaft may be held against reverse rotation. 21 designates a suitable crank handle which is fixed to one end of the shaft. Additional poles or standards 22 are also provided, which are adapted to be arranged in spaced relation to the end of the cart body, and to the upper ends of said poles, one end of a canopy or awning 23 of canvas or other suitable material is attached. This canvas extends over and is supported by the horizontal bar 13 and has its other end suitably attached to the end of the cart body, as clearly seen in Fig. 1.

In the use of the device, the chains 18 are wound upon the shaft 16 so as to support the cart body 7 in a horizontal position upon the axle. The grave is dug between the uprights 12 and the poles or standards 22 as seen in Fig. 2, and the excavated material is thrown into the cart over the tail gait. The canopy or awning 23 protects the grave digger against the sun's rays and the elements, and that portion of the canopy which extends over the cart also prevents the possibility of the earth being thrown beyond the cart and upon the ground. After the grave has been dug and the casket lowered into the same and sealed, the shaft 16 is released and the hooks 10 disengaged from the staples 11. The end of the cart adjacent the grave moves downwardly between the standards 12, and the tail gate swings open by the weight of the earth upon the same, so that the earth will move by gravity and be discharged into the grave. The tail gate 9 also serves to prevent the earth being thrown beyond the opposite side of the grave.

From the foregoing description, taken in connection with the accompanying drawing, the construction, manner of use, and several advantages of my invention will be clearly and fully understood. It will be seen that I have produced a very simply constructed, durable, and serviceable device for expeditiously filling graves and similar excavations. The cart may, of course, be made of any desired size and capacity, and while I have shown and described a particular means for supporting the canopy, various other supporting means may be substituted therefor. After using the device, the canvas may be folded and placed within the cart, the standards 12 and support 22 being also removed and stored away for future use. In view of the fact that but few parts are employed in the construction of my invention, it is manifest that the same can be produced at small manufacturing cost.

While I have herein shown and described the preferred construction and arrangement of the various elements, it is to be understood that the same are susceptible of considerable modification and I, therefore, reserve the privilege of adopting all such legitimate changes as may be fairly embodied within the spirit and scope of the invention as claimed.

Having thus fully described my invention, what I desire to claim and secure by Letters Patent is:

1. In a grave filling device, a tiltable cart to receive the excavated earth, standards arranged at opposite sides of the cart and at one end thereof, means mounted upon said standards and connected to the cart for raising one end thereof and sustaining the cart in a horizontal position, and guide means on opposite sides of the cart movable upon said standards when the cart body is tilted to discharge the excavated earth into the grave.

2. A grave filling device including a wheel supported tiltable cart body having a swinging end gate at one end, standards adapted to be arranged contiguous to opposite sides of the cart body at the latter end thereof, spaced metal guide straps secured to the sides of the cart body, through which the standards are disposed, and movable upon the standards when the cart body is tilted to discharge the excavated earth into the grave, and means mounted upon the standards including flexible elements connected to the cart body to elevate the discharge end thereof and sustain the cart body in a horizontal position.

3. In a grave filling device, a tiltable wheel supported cart body, vertically disposed standards arranged at opposite sides of the cart body adjacent one end thereof and having laterally curved end portions, spaced metal guide straps secured to the sides of the cart body and embracing the standards, said straps being movable upon the curved portions of the standards when the cart body is tilted to discharge its contents into the grave, and means mounted upon said standards including flexible elements connected to the cart body to elevate the discharge end of said body and sustain the cart body in a horizontal position.

In testimony whereof I hereunto affix my signature in the presence of two witnesses.

JOSEPH BURTON NICKS.

Witnesses:
R. E. NICHOLS,
WM. B. BELL.